Sept. 22, 1970            G. L. BARBER            3,529,816

VEHICLE, ESPECIALLY FOR AN AMUSEMENT RIDE OR THE LIKE

Original Filed Jan. 23, 1968            3 Sheets-Sheet 1

INVENTOR
GERALD L. BARBER

Sept. 22, 1970    G. L. BARBER    3,529,816
VEHICLE, ESPECIALLY FOR AN AMUSEMENT RIDE OR THE LIKE
Original Filed Jan. 23, 1968    3 Sheets-Sheet 2

INVENTOR
GERALD L. BARBER
BY

Sept. 22, 1970 G. L. BARBER 3,529,816
VEHICLE, ESPECIALLY FOR AN AMUSEMENT RIDE OR THE LIKE
Original Filed Jan. 23, 1968 3 Sheets-Sheet 3

INVENTOR
GERALD L. BARBER
BY

United States Patent Office 3,529,816
Patented Sept. 22, 1970

3,529,816
VEHICLE, ESPECIALLY FOR AN AMUSEMENT RIDE OR THE LIKE
Gerald L. Barber, 232 E. Bigelow, Findlay, Ohio 45840
Original application Jan. 23, 1968, Ser. No. 699,938, now Patent No. 3,176,983. Divided and this application Aug. 5, 1969, Ser. No. 847,620
Int. Cl. A63g 1/00
U.S. Cl. 272—29                    17 Claims

ABSTRACT OF THE DISCLOSURE

Jointed trailer vehicle having a center section and end sections pivoted to the center section and hydraulic motors connected between the center section and end sections to convert the vehicle from a flat collapsed position to a buckled A shape position. The trailer is adapted to form the conveying means for an amusement ride when the ride and trailer are collapsed and for supporting the ride in elevated position when the trailer is buckled to substantially an A shape.

RELATED APPLICATION

United States Application, Ser. No. 699,938; filed Jan. 23, 1968; entitled: Amusement Ride; Inventor: Gerald L. Barber.

SUMMARY OF THE INVENTION

The present invention relates to a vehicle especially adapted for use with an amusement ride, and particularly to a novel arrangement of the vehicle whereby the ride can be set up quickly and collapsed quickly and transported conveniently. This application is a division of my copending application, Ser. No. 699,938; filed Jan. 23, 1968, and entitled "Amusement Ride."

The amusement ride referred to is shown in my issued Pat. No. 3,176,983, and in my copending application, Ser. No. 699,938; filed Jan. 23, 1968 and entitled "Amusement Ride."

The present invention is particularly concerned with the construction of a vehicle for supporting a ride of the aforementioned nature, such that collapsing thereof and erection thereof and transportation theerof is quite convenient.

Many times, in order to achieve the greatest convenience in the collapsing and erecting of an amusement ride, or a like device which must be transported from place to place, some sacrifice of structural strength or stability of the device or the support therefor is necessary. The arrangement of the present invention, however, is particularly designed to provide an extremely strong stable structure for such a device whereby the utmost in safety and solidity is achieved while, at the same time, the device can be setup and collapsed and then transported with great dispatch.

Still further, a particular feature of the present invention is the incorporation of an amusement ride structure, or a device which must be transported from place to place, in a supporting vehicle of such nature that the vehicle itself forms the base for the device or structure when the device or structure is erected. Because of this feature, the structure or device always remains on the vehicle and can, therefore, be erected and collapsed very quickly and without a laborious time consuming process of loading parts thereof on a conveying vehicle.

Other particular features and advantages of the present invention will become more apparent upon reference to the following detailed specification, taken in connection with the accompanying drawings wherein.

Figure 1:
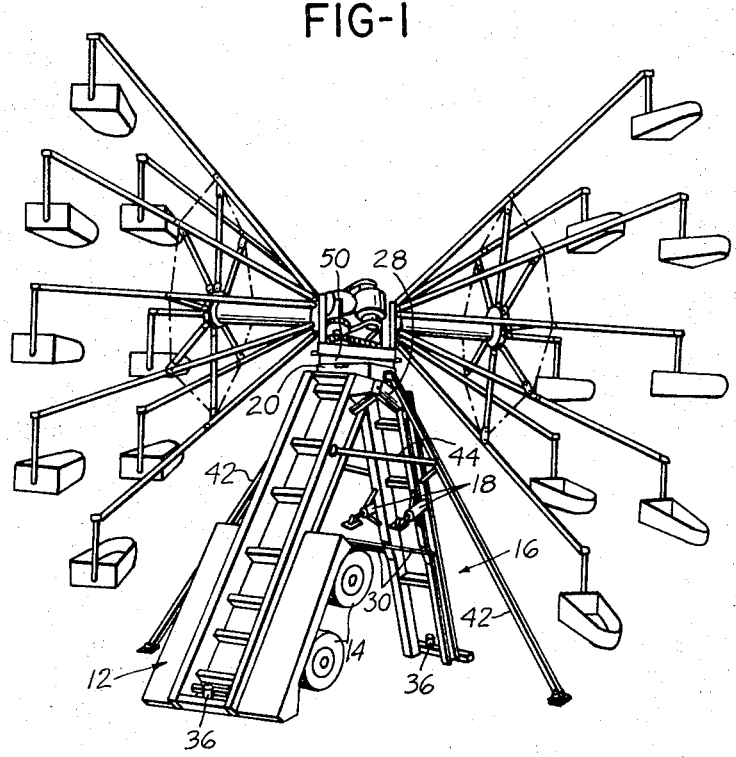
FIG. 1 is a perspective view showing an amusement ride on a vehicle according to the invention as the combination appears when erected.
Figure 5:
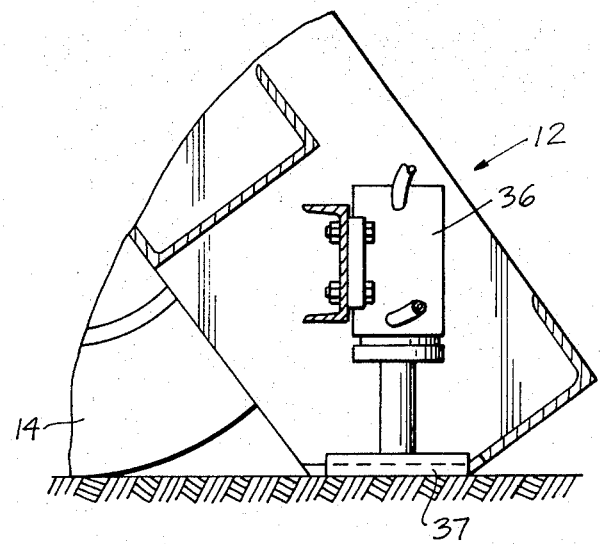
FIG. 5 is a fragmentary sectional view of one end of the vehicle showing the construction of a ground engaging pad arrangement on the vehicle.

Referring to the drawings somewhat more in detail, FIGS. 1 to 4 will show that the vehicle according to the present invention comprises a rear portion or section 12 having tandem wheels 14, a front portion or section 16 having adjustable support means 18 thereon, and a relatively short central portion or section 20 pivoted to the front and rear sections on the pivot axes 22 and 24.

Substantially conventional practices can be observed in fabricating the sections of the trailer vehicle. For example, only the rear section is shown as having wheels, but the front section could also have wheels, if desired.

Each of the front and rear sections 12 and 16 of the vehicle have plate members 26 dependent therefrom at the ends thereof adjacent the connections of the respective sections with the central section 20. Fluid motors 28, of which there are two at each side of the vehicle, are connected with central section 20 and points on the plates 26 displaced downwardly from the aforementioned pivotal connections of the front and rear sections of the trailer with the central section thereof. Each motor 28 has its one end connected to the central section 20 adjacent a respective one of the front and rear sections and its other end connected to one of the plates 26 attached to the other of the sections.

Figure 2:
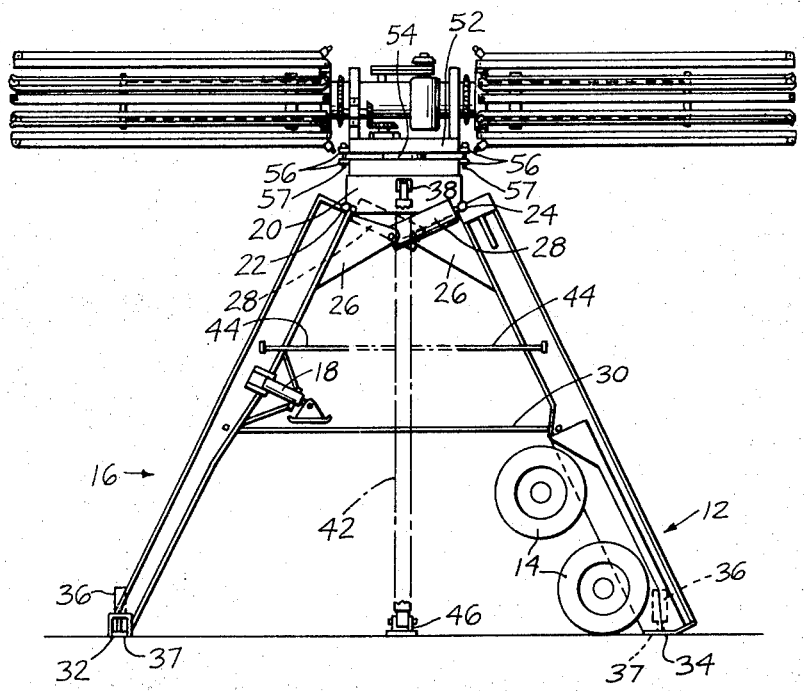
FIG. 2 is a side view showing the amusement ride partially collapsed but with the vehicle in buckled condition.
Figure 3:
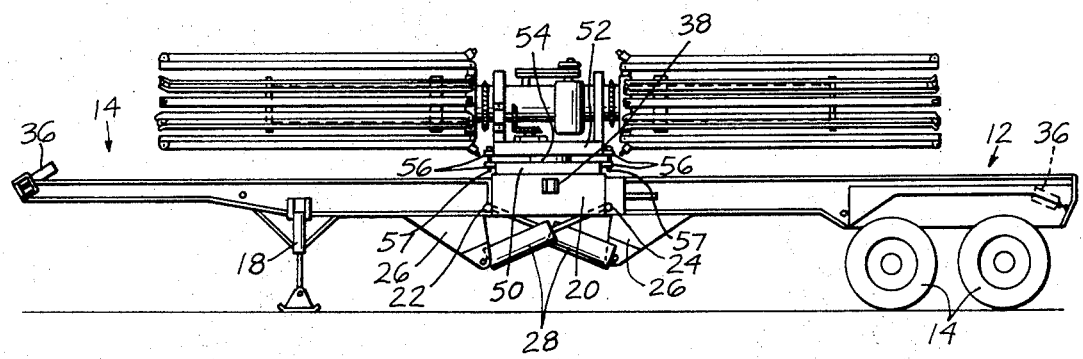
FIG. 3 is a view like FIG. 2 but shows the vehicle collapsed into transporting condition.
Figure 4:
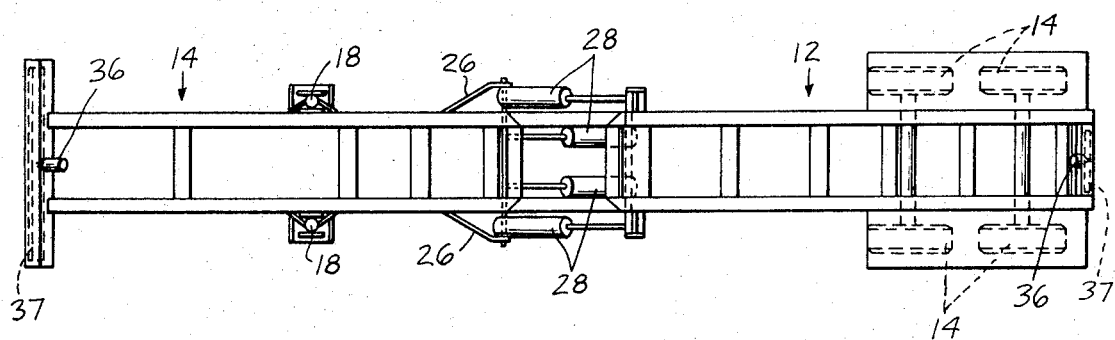
FIG. 4 is a plan view looking down on top of the supporting vehicle or trailer structure with the elements of the amusement ride removed therefrom.

As can best be seen in FIG. 3, when the said motors 28 are extended, the front and rear sections 12 and 16 of the vehicle, together with the central section 20, form a substantially flat vehicle bed. It will be seen that the front and rear sections and the center section of the vehicle abut when the vehicle is in its lowered position so that an extremely strong structure results. The portions can, of course, be bolted together when in lowered position. Energization of the aforementioned fluid motors to draw the rods thereof inwardly will cause the vehicle to buckle up toward the position in which it is shown in FIGS. 1 and 2, the said buckled position being such that the central section 20 is elevated to the position illustrated in those figures and substantially horizontally disposed.

When the central section 20 of the vehicle has been elevated to the point that the pistons in motors 28 bottom in the respective motor cylinders, the central section 20 will be level and the vehicle structure in its buckled position will be stable. It will be understood that the pistons need not physically bottom in their cylinders but will be stopped therein as by the end or central section to which the piston is connected engaging the end of the cylinder of the piston.

It is advantageous to connect tie members, as schematically indicated at 30, between the front and rear portions so that the buckled vehicle will be firmly held in its stable buckled position even in the absence of fluid pressure in motors 28. Brace, or tie, members 30 can be simply rods which are detachably connected to at least one of the front and rear vehicle sections, while being pivotal on the other, or the members 30 could be detachably connected to both of the said sections. If members 30 are made adjustable in length, as by a turnbuckle, the ends could be arranged bent over and could merely be dropped in eyes on the vehicle front and rear sections. Other connecting arrangements will suggest themselves.

Advantageously, both the front and rear extreme ends of the front and rear sections of the vehicle structure, as indicated at 32 and 34, are so inclined that a relatively large bearing area is formed thereon for engagement with the ground or other supporting surface when the vehicle is actuated into its buckled position.

Further, fluid motors 36 and foot members 37 pertaining thereto could be provided at the front and back ends of the said front and rear sections, respectively, of the vehicle for enhancing the security of the engagement of the extreme ends of the vehicle with the ground when the vehicle is actuated into buckled position. At least the front ones of the rear tandem wheels of the vehicle, as will be seen in FIGS. 1 and 2, are lifted from the ground when the vehicle is in buckled position.

Figure 6:
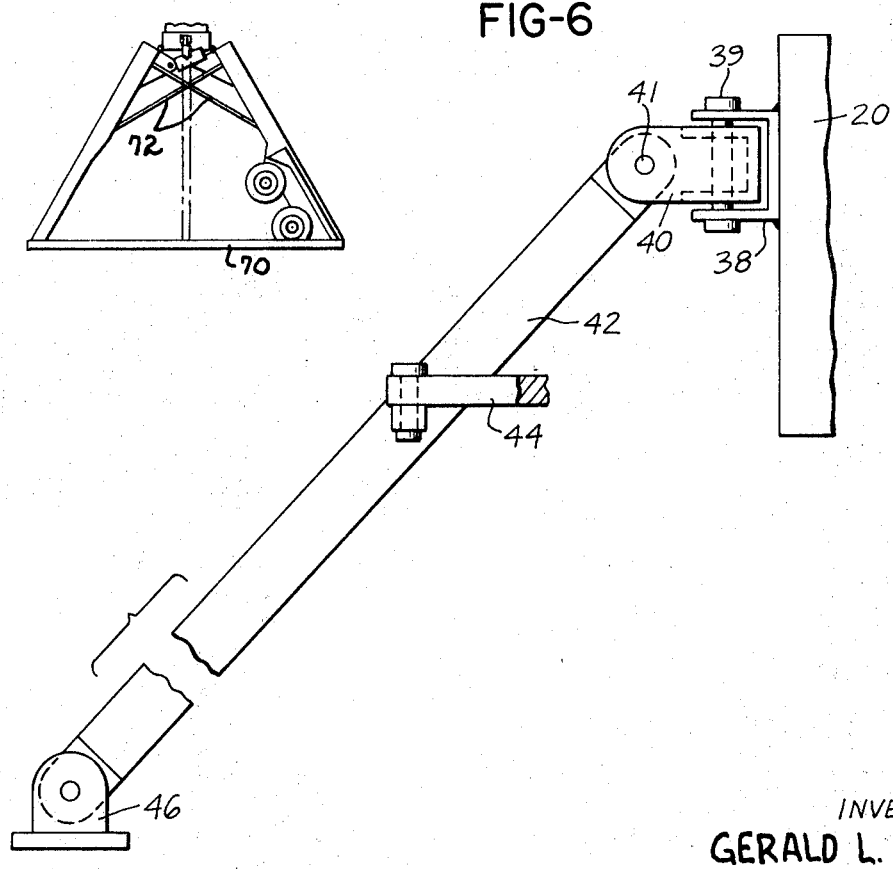
FIG. 6 is a framentary view drawn at somewhat enlarged scale showing a supporting brace post employed to impart stability to the vehicle when it is erected.

The central section 20 of the vehicle has a pivotal brace member supporting arrangement on each side thereof, one of which will be seen in FIGS. 1, 2 and 6. This pivotal supporting arrangement comprises a bracket member 38 fixed to each lateral side of central section 20, as by welding, and each of which supports a respective second bracket member 40, as by a pin 39, so that each bracket member 40 can pivot on its bracket member 38 in the fore and aft direction of the vehicle about the vertical axis of its pin 39.

Bracket member 40, in turn, has a horizontal pin 41 forming a horizontal pivot axis on which the upper end of a brace member, or support post, or beam, 42 is pivoted. The brace members, or beams, 42 will be seen in FIGS. 1, 2 and 6 where it will be noted that they provide lateral bracing for the vehicle when it is actuated into its buckled position.

Advantageously, further brace arms 44 are provided extending between the brace members 42 and the front and rear sections of the vehicle to hold the brace members 42 in the proper angular positions relative to the vehicle. Arms 44 are detachable from at least one of the respective brace members 42 and the respective one of sections 12 and 16 and may be pivotally connected to the other thereof for convenience in erecting and collapsing the vehicle.

By utilizing the above described pivotal connections formed by brackets 38 and 40 at the upper ends of the brace members 42, it becomes possible, after arms 44 have been released, and upon collapsing the vehicle, merely to swing the brace members 42 laterally so that they lie along the sides of the vehicle and to secure them in place for transport. The brace members 42 can readily be brought back into operative position when the vehicle is again to be actuated into buckled condition. The bracing arms 44 could, as mentioned, have readily detachable connections at either one end or both ends thereof to facilitate the erection and collapsing of the vehicle. Brace members 42 may advantageously have swivel feet 46 thereon and, furthermore, may be adjustable in length if so desired.

Mounted on top of central section 20 of the vehicle and fixed thereto, as by welding or bolting, is an intermediate, or spacer, or base member, 50 which provides the supporting base proper for the device or structure carried by the vehicle, in the present case, an amusement ride. Spacer member 50 is box-like in configuration and disposed immediately thereabove is another and similar box-like supporting frame member 52. A shaft 54 fixed to spacer member 50 or to central section 20 of the vehicle, or to both thereof, extends upwardly into frame member 52 and defines a vertical pivot axis about which all, or a portion of the device or structure carried by the vehicle can rotate. Frame member 52 may be rotatably supported on the spacer member 50 as by an antifriction bearing means so as to be freely rotatable about the axis of stationary shaft 54.

Both of members 50 and 52 are provided with apertured lugs 56 through which bolts 57 can be passed for fixedly clamping the two members together against rotation during transporting of the device or structure carried by the vehicle. When the vehicle is buckled, the bolts may be withdrawn from the apertured lugs 56 so that member 52 can rotate on member 50. It will be noted that lugs 56 align when the device or structure carried by the vehicle is in its FIG. 3, or transport position.

Figure 7:
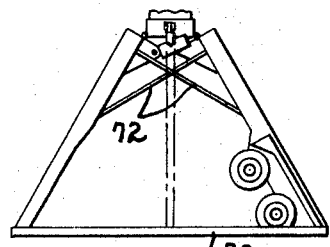
FIG. 7 is a fragmentary view showing a different mannar of bracing the end sections of the vehicle when buckled.

FIG. 7 shows another manner of bracing the end sections of the vehicle when it is buckled. In FIG. 7 it will be seen that a brace member 70 is provided extending between the lower ends of the front and rear sections of the vehicle. Brace member 70 could be in the form of a single brace member arranged in the middle of the vehicle, or it could be in the form of two separate brace members, one on each side of the vehicle. In addition, other brace members 72 are provided, extending diagonally between the end sections. Brace members 72, as well as brace member 70, can be made adjustable in length and can be availed of for levelling the platform interconnecting the front and rear sections. In practice, it is easily more convenient to employ hydraulic motors to move the platform into level condition and then to adjust the braces in conformity therewith. The brace arrangement shown in FIG. 7 makes for a rigid structure when the vehicle is buckled and one which can readily be adjusted, if necessary, to maintain the platform level.

The arrangement of the present invention has been disclosed for the specific purpose of transporting amusement rides and for supporting the rides in elevated position when in use. However, it will be apparent that the vehicle structure illustrated and claimed is adapted for transporting other devices as well, for example, ground working devices, such as augers, or drills, or impact devices for driving bits into rock formations.

Modifications can be made within the scope of the appended claims.

What is claimed is:

1. A vehicle comprising: a central section and end sections pivotally connected to opposite ends of said central section, said sections being disposed in end to end relation to form a substantially flat bed supported on support means on one end section and wheels on the other end section when the vehicle is in lowered position, and means for pivoting said end sections downwardly about the pivotal connection thereof with said central section to form a generally A shaped support with said central section at the top and with the outer ends of said end sections in position to engage a supporting surface beneath the vehicle.

2. A vehicle according to claim 1, in which the pivotal connections between said central section and end sections is disposed toward the bottom of said sections and the adjacent ends of said sections are disposed in abutting relation when the vehicle is in lowered position.

3. A vehicle according to claim 2, in which said means for pivoting said end sections downwardly comprises fluid motors operatively connected between said end sections and said central section and acting along lines spaced downwardly from the axes of pivotal connection of said end sections with said central section.

4. A vehicle according to claim 3, in which said fluid motors comprise pistons and cylinders and said pistons operatively abut their respective said cylinders when said end sections reach predetermined downwardly pivoted positions on said central section.

5. A vehicle according to claim 4, in which said end sections include plates dependent therefrom near their ends which are adjacent said central section and each said fluid motor is connected between a lower point on a respective said plate and a region of said central section on the opposite side thereof from the respective plate.

6. A vehicle according to claim 3, in which the extreme ends of said end sections which are remote from said central section are shaped to rest flat on a supporting surface when said end sections are pivoted downwardly to said predetermined positions on said central section.

7. A vehicle according to claim 3, which includes a foot member moveably mounted on the end of each end section which is remote from said central section for engagement with the supporting surface beneath the vehicle.

8. A vehicle according to claim 3, which includes bracket means on the opposite lateral sides of said central section, and brace members connected to said bracket means and extending downwardly and outwardly therefrom into engagement with the supporting surface beneath the vehicle to brace the vehicle laterally when the said end sections are in their downwardly pivoted position and said central section is in elevated position.

9. A vehicle according to claim 8, in which each said bracket means includes a first bracket fixed to said central section, a second bracket pivoted to said first bracket on a vertical axis, and each brace member at its upper end being connected to its respective second bracket on a pivot axis extending at right angles to said vertical axis.

10. A vehicle according to claim 9, which includes brace arms detachably connected between each said brace member and said pivoted down end sections.

11. A vehicle according to claim 4, in which said central section is substantially shorter than either of said end sections and said end sections are about equal in length.

12. A vehicle according to claim 11, in which said central section includes a shaft upstanding vertically therefrom, and a base member rotatable on said shaft and supported on said central section.

13. A vehicle according to claim 12, which includes means for fixing said base member and central section together to prevent rotation of said base member on said central section.

14. A vehicle according to claim 1, which includes brace elements extending between said end sections and secured thereto.

15. A vehicle according to claim 14 in which said brace elements include at least two elements extending diagonally between said end sections in intersecting relation to each other when viewed from the side of the vehicle.

16. A vehicle according to claim 15, which includes a still further brace element extending between said end sections near the bottom thereof.

17. A vehicle according to claim 16, in which at least the said diagonally extending brace elements are adjustable in length.

References Cited

UNITED STATES PATENTS

| | | | |
|---|---|---|---|
| 936,854 | 11/1909 | Beattie | 187—8.52 X |
| 1,924,797 | 8/1933 | Mitchell | 280—423 X |
| 1,978,622 | 10/1934 | Clapp | 187—8.52 |
| 2,053,368 | 9/1936 | Hott | 187—8.52 |
| 2,569,982 | 10/1951 | Estel | 187—8.52 |
| 2,792,079 | 5/1957 | Gibson | 214—38.22 X |
| 2,847,216 | 8/1958 | Courtney | 272—29 X |
| 3,288,315 | 11/1966 | Bigden | 280—423 X |

ANTON O. OECHSLE, Primary Examiner

A. W. KRAMER, Assistant Examiner

U.S. Cl. X.R.

284—423; 187—8.41